United States Patent
Kulkarni et al.

(10) Patent No.: US 12,489,683 B1
(45) Date of Patent: Dec. 2, 2025

(54) NETWORK FUNCTION CONFIGURATOR AND TEST GENERATOR

(71) Applicant: MICROSOFT TECHNOLOGY LICENSING, LLC, Redmond, WA (US)

(72) Inventors: Kavita Swapnil Kulkarni, Old Bridge, NJ (US); Andrew Scott Brooks, Northborough, NJ (US); Steven Rhejohn Barlin So, Burlington, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 7 days.

(21) Appl. No.: 18/677,793

(22) Filed: May 29, 2024

(51) Int. Cl.
*H04L 41/0895* (2022.01)
*H04L 41/0869* (2022.01)
(Continued)

(52) U.S. Cl.
CPC ...... *H04L 41/0895* (2022.05); *H04L 41/0869* (2013.01); *H04L 41/12* (2013.01); *H04W 24/02* (2013.01); *G06F 40/30* (2020.01)

(58) Field of Classification Search
None
See application file for complete search history.

(56) References Cited

U.S. PATENT DOCUMENTS

| 9,755,934 B1 * | 9/2017 | Shaham | H04W 24/00 |
| 10,678,665 B2 * | 6/2020 | Shmouely | G06F 11/3495 |

(Continued)

FOREIGN PATENT DOCUMENTS

| EP | 3174245 A1 * | 5/2017 | H04L 41/122 |
| KR | 20180087614 A * | 8/2018 | H04L 45/586 |
| WO | WO-2015047452 A1 * | 4/2015 | G06F 11/3692 |

OTHER PUBLICATIONS

Tsai et al., "Design and Develop an OpenFlow Testbed within Virtualized Architecture"; 2013 IEICE; Downloaded on Jul. 22, 2025 from IEEE Xplore. (Year: 2013).*

(Continued)

*Primary Examiner* — Sandarva Khanal
(74) *Attorney, Agent, or Firm* — Han Gim; Newport IP, LLC

(57) ABSTRACT

A network function configuration and test generation framework are configured to generate a test script indicative of a configuration and test cases for verifying a virtual function implemented in a virtualized computing environment. A test input is received that encodes information for verifying a network function. The information includes identification of a test tool, a target testbed for testing the network function, and network information including parameters for network conditions to be operational during testing of the network function. A data parser translates and formats the test input. The formatted test input in input to a topology discoverer configured to identify a network topology of the testbed and which network functions deployed on the testbed are emulated and which network functions deployed on the testbed are real. A configuration generator generates a configuration file usable to configure applicable network functions and their functionalities.

20 Claims, 5 Drawing Sheets

(51) Int. Cl.
*H04L 41/12* (2022.01)
*H04W 24/02* (2009.01)
*G06F 40/30* (2020.01)

(56) References Cited

U.S. PATENT DOCUMENTS

| | | | |
|---|---|---|---|
| 10,700,946 B2* | 6/2020 | Kojukhov | H04L 41/5032 |
| 10,880,173 B2* | 12/2020 | Seenappa | H04L 41/5058 |
| 11,128,556 B2* | 9/2021 | Prasad | G06F 9/45558 |
| 2017/0085459 A1* | 3/2017 | Xia | H04L 43/12 |
| 2018/0121335 A1* | 5/2018 | Cillis | G06F 11/3672 |
| 2019/0052549 A1* | 2/2019 | Duggal | G06Q 30/0635 |
| 2019/0104047 A1* | 4/2019 | Tejaprakash | H04L 43/50 |
| 2019/0342187 A1* | 11/2019 | Zavesky | H04L 41/5009 |
| 2020/0322218 A1* | 10/2020 | Anwer | H04L 41/0866 |
| 2024/0338458 A1* | 10/2024 | Wang | G06F 21/577 |
| 2025/0112848 A1* | 4/2025 | Veerappa Somawagol | H04L 43/50 |

OTHER PUBLICATIONS

Riggio et al., "EmPOWER: A Testbed for Network Function Virtualization Research and Experimentation"; Nov. 2013; Downloaded on Jul. 22, 2025 from IEEE Xplore. (Year: 2013).*

* cited by examiner

NETWORK FUNCTION CONFIGURATOR AND TEST GENERATOR

BACKGROUND

There are a variety of 3GPP/5G compliant and EPC/Any-G products and services that comprise a collection of network functions (NF's) that are deployed in many computing environments. However, it is difficult to provide accurate and complete test coverage for a given configuration in a 4G/5G environment because of the complexity of the network functions and system configurations. Attempts to provide accurate and complete test coverage can be extremely costly both in computing resources required and engineering labor.

It is with respect to these considerations and others that the disclosure made herein is presented.

SUMMARY

The present disclosure includes the use of trained artificial intelligence (AI) models to automatically discover the network topology and network functions (NFs) in a 4G/5G/Any-G network, determine which of the discovered NFs are real or emulated NFs, and configure the NFs and their functionality to support a desired test. The trained AI models output a packaged configuration for test cases and NFs that implement a desired test. This allows for an automated way to provide accurate and complete test coverage for a given configuration in a 4G/5G environment.

In an embodiment, a network function configurator and test generator framework is configured to generate a test script indicative of a configuration and test cases for verifying a virtual function implemented in a virtualized computing environment executing a plurality of virtual machines or containers implementing a mobile communications network. The network function configurator and test generator framework receives a test input encoding information for verifying a network function configured to operate in the virtualized computing environment. The information includes identification of a test tool that is implemented in the virtualized computing environment, a target testbed for testing the network function, and network information including parameters for network conditions to be operational during testing of the network function. A data parser translates and formats the test input. The formatted test input in input to a topology discoverer configured to identify a network topology of the testbed and identify which network functions deployed on the testbed are emulated and which network functions deployed on the testbed are real. The translating and formatting comprises syntactic and semantic translation of the test input, and the syntactic and semantic translation prompts the topology discoverer to identify the network topology and configurations of the network topology. Based on outputs received from topology discoverer, a configuration generator generated a configuration file usable to configure applicable network functions and their functionalities. The testbed is configured based on the configuration file to verify the virtual function in the virtualized computing environment.

The described techniques can allow for a service provider or customer to more efficiently update and deploy computing resources while maintaining efficient use of computing capacity such as processor cycles, memory, network bandwidth, and power.

This Summary is provided to introduce a selection of concepts in a simplified form that are further described below in the Detailed Description. This Summary is not intended to limit the scope of the claimed subject matter.

DESCRIPTION OF DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Verifying a stable deployment which is robust, efficient and secure is often challenging. Deploying or updating a network function in the cloud as a cloud service is not straightforward because of the many factors that need to be taken into account. For example, it is difficult to maintain information about each and every network function that can be provided in a complex multi-vendor platform and to configure the network functions, understand their function and impacts, and confirm whether the network functions are compatible with each other. Additionally, the multi-vendor platform can be adapted to different solutions and configurations for that solution while utilizing various test and validation tools. This requires a significant of resources both in computing resources required and engineering labor to understand the network functions, specific solutions and configurations, and tools.

The disclosed embodiments describe an AI-based network function configurator and test generator that is configured to use trained AI models to automatically discover the network topology of a 4G/5G/Any-G network, which discovered NFs are real or emulated NFs, and configure the NFs and their functionality to support a desired test. Thus an operator would only need to specify a desired test objective, and the AI-based network function configurator and test generator will automatically provide the test scripts and test configuration that is needed to implement the desired test. In an embodiment, the trained models output a packaged configuration for test cases and NFs that implements the desired test. This allows for an automated way to provide accurate and complete test coverage for a given configuration in a 4G/5G environment.

The AI-based network function configurator and test generator enables resources such as computing resource allocations and engineering tasks to be more efficiently allocated. The AI-based network function configurator and test generator also centralizes many issues associated with tests or configurations that often have to be performed manually and in a sequential manner. The AI-based network function configurator and test generator further enables modularity that enables efficient functional and performance testing of the product or device under test.

Figure 1:
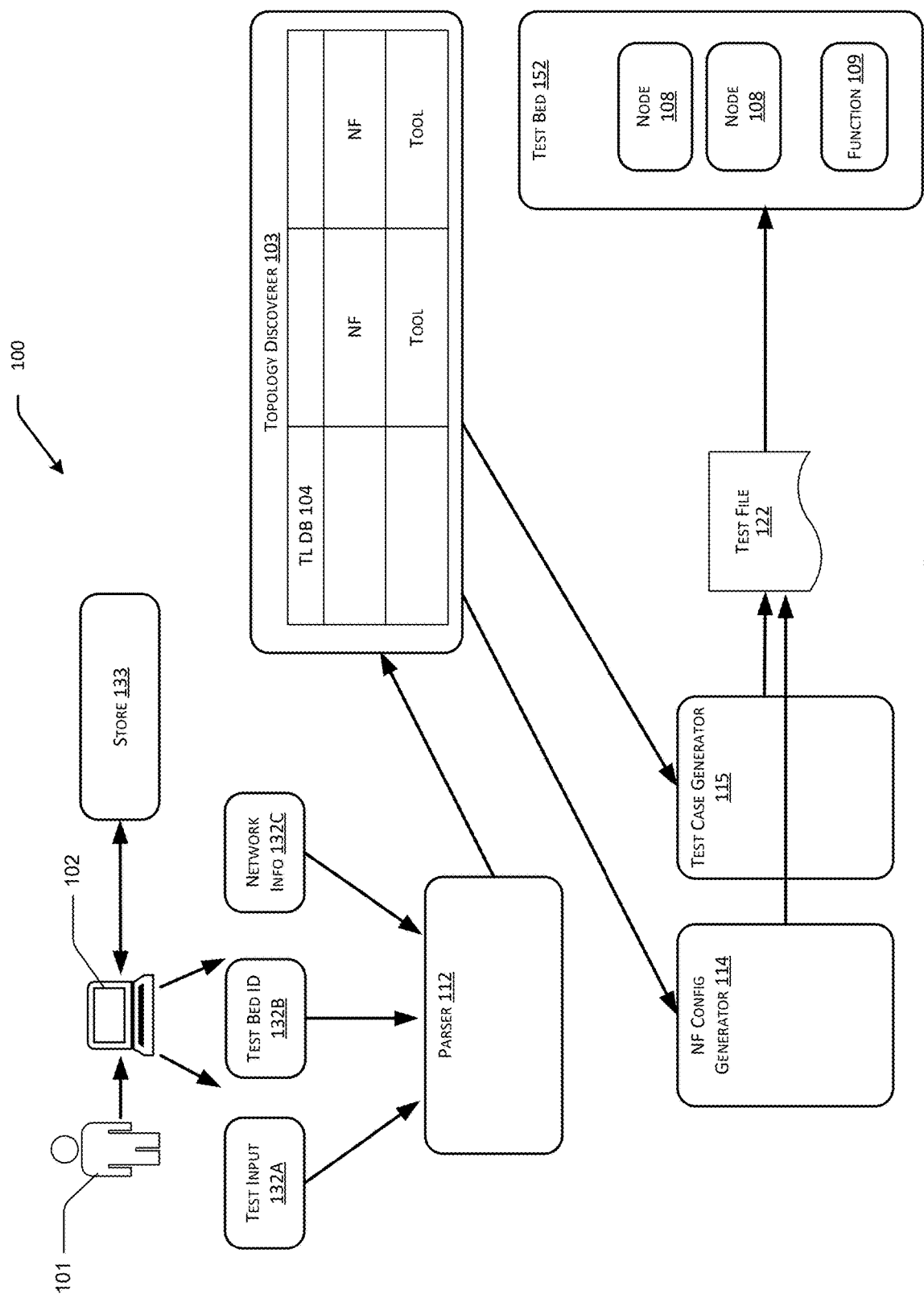
FIG. 1 is a diagram illustrating an example architecture in accordance with the present disclosure.

With reference to FIG. 1, a network function configurator and test generator framework 100 is configured to generate a test file 122 indicative of a configuration and test cases for verifying virtual functions 109 implemented in a virtualized computing environment executing a plurality of virtual machines or containers. The network function configurator and test generator framework 100 is configured to access a test input 132A encoding objectives for verifying the virtual function 109 in a node 108 configured to operate on a test bed 152. The network function configurator and test generator framework 100 is also configured to access indication of a test bed identifier or name 132B and network information 132C. A store 133 of test inputs 132A, test beds 132B, and network information 132C is optionally available. An operator 101 can enter information via computer 102.

The network function configurator and test generator framework 100 is configured to execute a topology discoverer 103. The topology discoverer 103 is configured to output the discovered topology to NF configuration generator 114 and test case generator 115. The NF configuration generator 114 and test case generator 115 are configured to output a test file 122 encoding a configuration and test cases usable for verifying the virtual function 109 in the test bed 152.

In one embodiment, topology discoverer 103 includes functionality that implements a data-driven model that uses topology layer database 104 based on the input test statements, configuration data, and other information. The topology discoverer 103 can include a classifier and database 104 which can include one or more tables or other data structures.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples. While many examples are described using servers and disks, it should be understood that other types of compute nodes and storage devices may be used in other embodiments.

Figure 2:
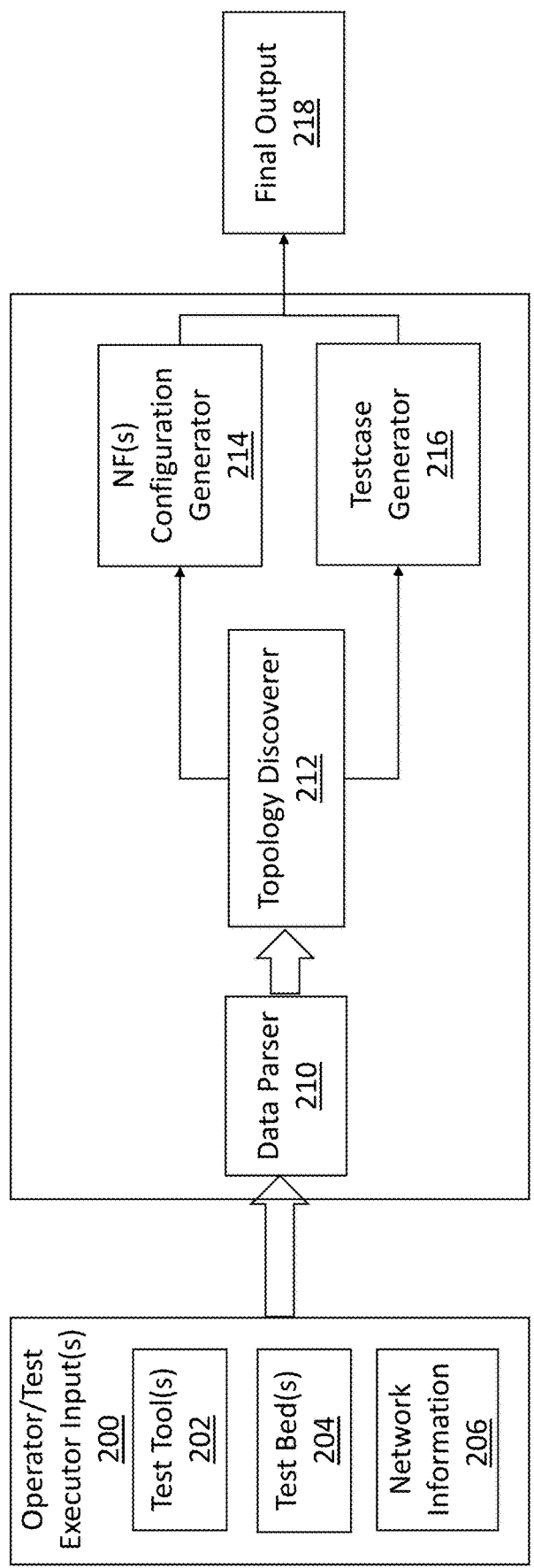
FIG. 2 is a diagram illustrating an example architecture in accordance with the present disclosure.

With reference to FIG. 2, in an embodiment, operator/user inputs 200 are inputs provided by the test executor (e.g., operator or tester) to trigger test execution on one or more 4G/5G products and functions. The disclosed network function configuration and test generation can be implemented, for example, in labs for development, system, and interoperability test labs or in live production environments.

Based on system and other requirements, a user selects one or more 3rd party or in-house test tools 202 to trigger 4G/5G call models as well as to emulate desired network functions. The test tools 202 may vary based on whether the tools are 3rd party or in-house, while interoperability can also depend on the specific tools and the degree to which emulation has been used during development of the tools. The test tools 202 can be complex, and it is difficult to determine how a change to a single network function will affect a given test case.

4G/5G products can be deployed as VM based network functions (VNFs) or containerized network functions (CNFs) on different platforms such as on-premises OpenStack, OpenShift, and Azure Kubernetes Service (AKS). Based on the test solution, deployment can be spread across multiple testbeds 204. A user can provide corresponding access information for where tests will be performed. A testbed can be a controlled and configurable environment for testing and validating a network function.

Customer or lab specific network information 206 may be required for telecommunication product testing. Examples include data network name (DNN), Slice, public land mobile network (PLMN), tracking area code (TAC), and International Mobile Subscriber Identity IMSI/Subscription Permanent Identifier (SUPI) range.

Data parser 210 identifies the type of input data being passed in and parses the data into a specific format that can be consumed and forwarded by topology discoverer 212. Based on tool or testbed selection, the data parser 210 performs different actions to extract desired data required for connection establishment.

4G/5G telecom products typically comprise multiple network functions which need to be connected for successful end to end call model execution. Per test requirements, these networks functions can be real or emulated using tools. The topology discoverer 212 identifies the network topology of the testbed (4G/5G/Any-G) and real network functions deployed on testbeds and the remaining network functions which are emulated NFs using tools. Examples of network functions can include, for example, a session management function and a network repository function (NRF). The models can be trained with the 3GPP specification and related documentation.

In some embodiments, the topology discoverer 212 can access a database of network elements and network functions. The topology discoverer 212 can communicate with and query various network elements and network functions, access network routing and configuration information, and inputs from network operators. In some embodiments, the topology discoverer 212 can be an AI model that is trained to identify the network topology, identify network functions that are real (e.g., operational and not emulated), and identify network functions which are emulated NFs (e.g., NFs that are providing emulated interfaces for testing or simulation purposes). The ability to discover the topology allows for more efficient development of test cases as the test operator does not need comprehensive knowledge of the network topology and its network function configuration.

Based on inputs received from topology discoverer 212, configuration generator 214 outputs a configuration file that is usable to configure applicable network functions and their functionalities. The configuration generator 214 can be implemented by training large language models such as a Generative Pre-trained Transformer (GPT) model with previously determined NF configurations. The GPT model can also be trained with product documentation for what is being tested in order to accurately determine the baseline configurations. The configuration generator 214 identifies which NFs are real NFs and which are emulated NFs, and generates the configuration accordingly. In some embodiments, the topology discoverer 212 can utilize agents that execute on various servers and other devices or platforms in the network that detects various aspects of the network topology and network functions that are running or being emulated in the network.

Testcase generator 216 generates the test cases or updates existing test cases, accounting for which NFs are real NFs and which are emulated NFs and thus which NFs and call models are to be emulated. The testcase generator 216 can be implemented by training large language models such as a GPT model with previously tested NF configurations. The GPT model can also be trained with product documentation for what is being tested in order to intelligently determine the test cases. Testcase generator 216 can generate, for example, a YAML file, XML file, or configuration file that determines the types of tests that the product will undergo. Examples of test cases can include performance, resiliency, or functional tests. The final output 218 can be a packaged configuration for both test cases and network functions.

The use of the network function configurator and test generator framework allows a test operator to avoid expending resources to determine the internal details about a given 4G/5G/Any-G network product and avoid obtaining complete end to end topology information.

Figure 3:
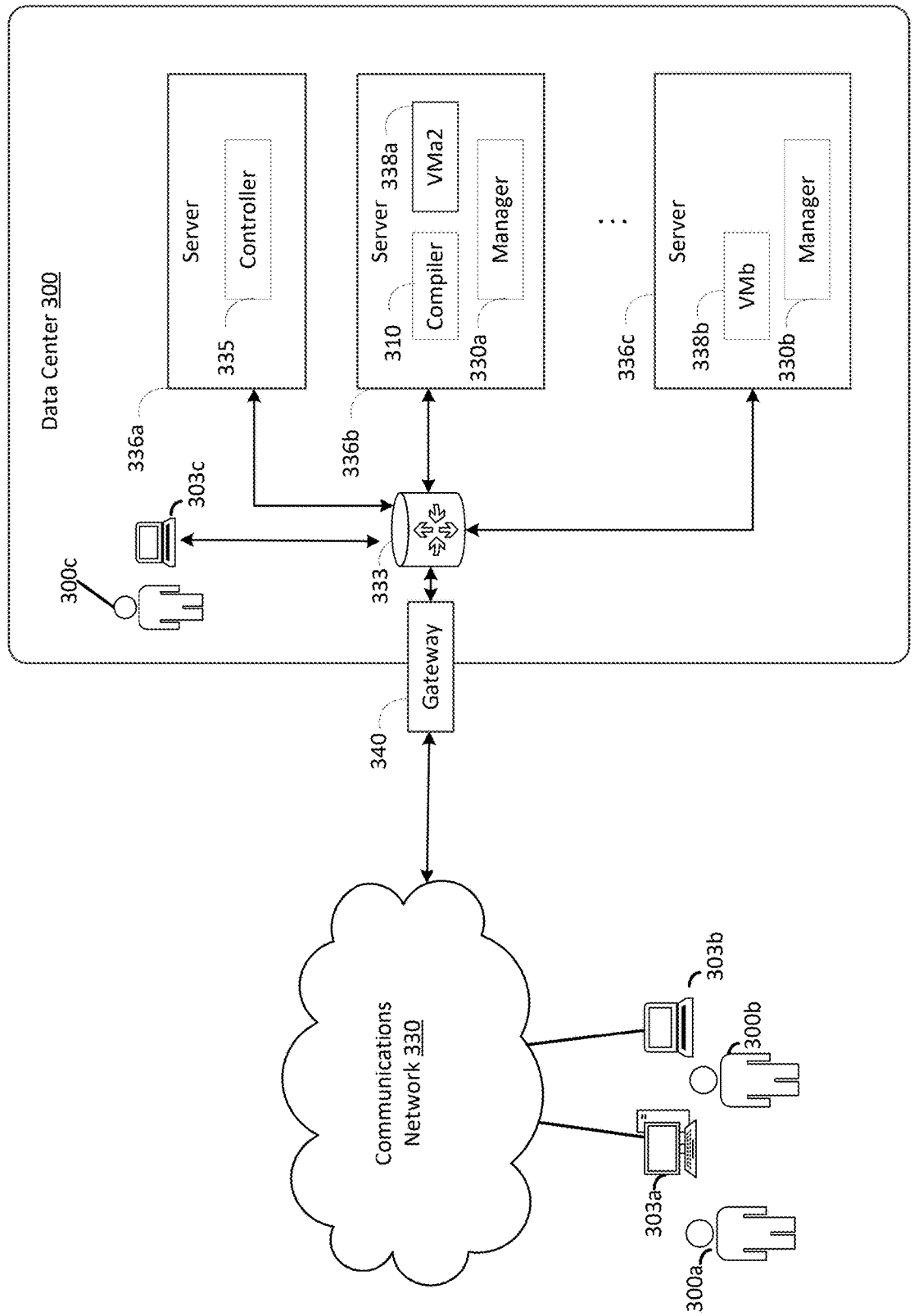
FIG. 3 is a diagram illustrating an example architecture in accordance with the present disclosure.

FIG. 3 illustrates an example computing environment in which the embodiments described herein may be implemented. FIG. 3 illustrates a data center 300 that is configured to provide computing resources to users at the customer environment. The customer environment may have user computers that may access services provided by data center 300 via a network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like.

Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor). Networking resources may include virtual networking, software load balancer, and the like. The virtual machines may be configured to execute applications, including Web servers, application servers, media servers, database servers, and the like. Data storage resources may include file storage devices, block storage devices, and the like.

Data center 300 may have various computing resources including servers, routers, and other devices that may provide remotely accessible computing and network resources using, for example, virtual machines. Other resources that may be provided include data storage resources. Data center 300 may also execute functions that manage and control allocation of network resources, such as a network manager 330a.

Network 330 may, for example, be a publicly accessible network of linked networks and may be operated by various entities, such as the Internet. In other embodiments, network 330 may be a private network, such as a dedicated network that is wholly or partially inaccessible to the public. Network 330 may provide access to computers and other devices at the customer environment.

The disclosed embodiments may be implemented in a mobile edge computing (MEC) environment implemented in conjunction with a 4G, 5G, or other cellular network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

It should be appreciated that although the embodiments disclosed above are discussed in the context of virtual machines, other types of implementations can be utilized with the concepts and technologies disclosed herein. It should be also appreciated that the network topology illustrated in FIG. 3 has been greatly simplified and that many more networks and networking devices may be utilized to interconnect the various computing systems disclosed herein. These network topologies and devices should be apparent to those skilled in the art.

FIG. 3 illustrates that computing resources are provided to users 300a, 300b, or 300c (which may be referred herein singularly as "a user 300" or in the plural as "the users 300") via user computers 303a,303b, and 303c (which may be referred herein singularly as "a computer 303" or in the plural as "the computers 303") via communications network 330.

Data center 300 may include servers 336a, 334, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

In an embodiment, a compiler 310 as described herein may be implemented in server 334. The compiler 310 may include a mapping layer as further described herein (not shown in FIG. 3).

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303*a*, 303*b* or 303*c* may be a server, a desktop or laptop personal computer, a tablet computer, a smartphone, a set-top box, or any other computing device capable of accessing data center 300. User computer 303*a* or 303*b* may connect directly to the Internet (e.g., via a cable modem). User computer 303*c* may be internal to the data center 300 and may connect directly to the resources in the data center 300 via internal networks. Although only three user computers 303*a*,303*b*, and 303*c* are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330*a* or 330*b* (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 336*a* and 334. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
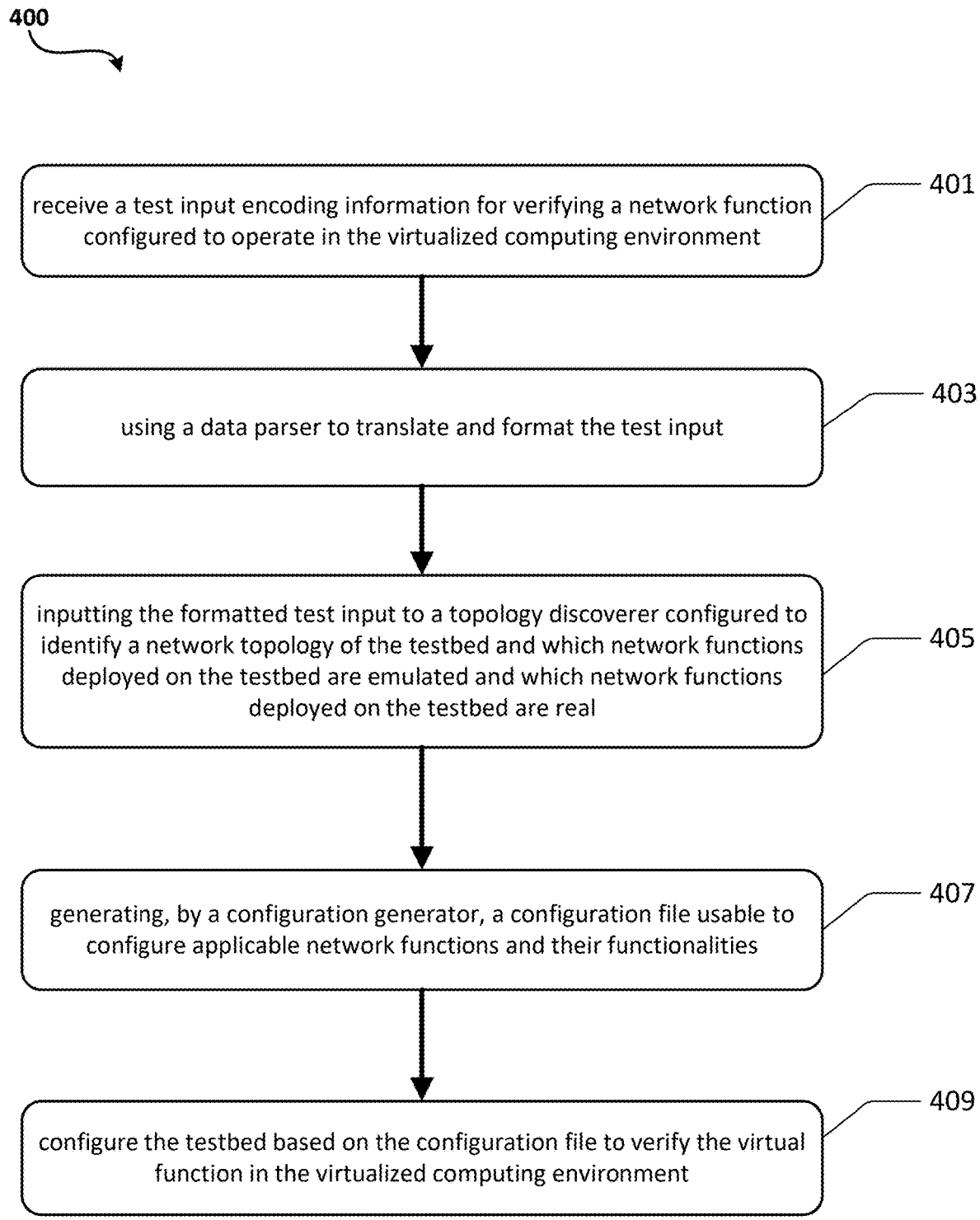
FIG. 4 is a flowchart depicting an example procedure for network function configuration and test generation in accordance with the present disclosure.

Turning now to FIG. 4, illustrated is an example operational procedure for running a network function configuration and test generation framework implemented in a virtualized computing environment executing a plurality of virtual machines or containers. Such an operational procedure can be provided by one or more components illustrated in FIGS. 1 through 3. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 400 is described as running on a system, it can be appreciated that the routine 400 and other operations described herein can be executed on an individual computing device or several devices.

Referring to FIG. 4, operation 401 illustrates receiving a test input encoding information for verifying a network function configured to operate in the virtualized computing environment, the information including identification of a test tool that is implemented in the virtualized computing environment, a target testbed for testing the network function, and network information including parameters for network conditions to be operational during testing of the network function.

Operation 403 illustrates using a data parser to translate and format the test input.

Operation 405 illustrates inputting the formatted test input to a topology discoverer configured to identify a network topology of the testbed and which network functions deployed on the testbed are emulated and which network functions deployed on the testbed are real; wherein the translating and formatting comprises syntactic and semantic translation of the test input, and wherein the syntactic and semantic translation prompts the topology discoverer to identify the network topology and configurations of the network topology.

Operation 407 illustrates based on outputs received from topology discoverer, generating, by a configuration generator, a configuration file usable to configure applicable network functions and their functionalities.

Operation 409 illustrates configuring the testbed based on the configuration file to verify the virtual function in the virtualized computing environment.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 5:
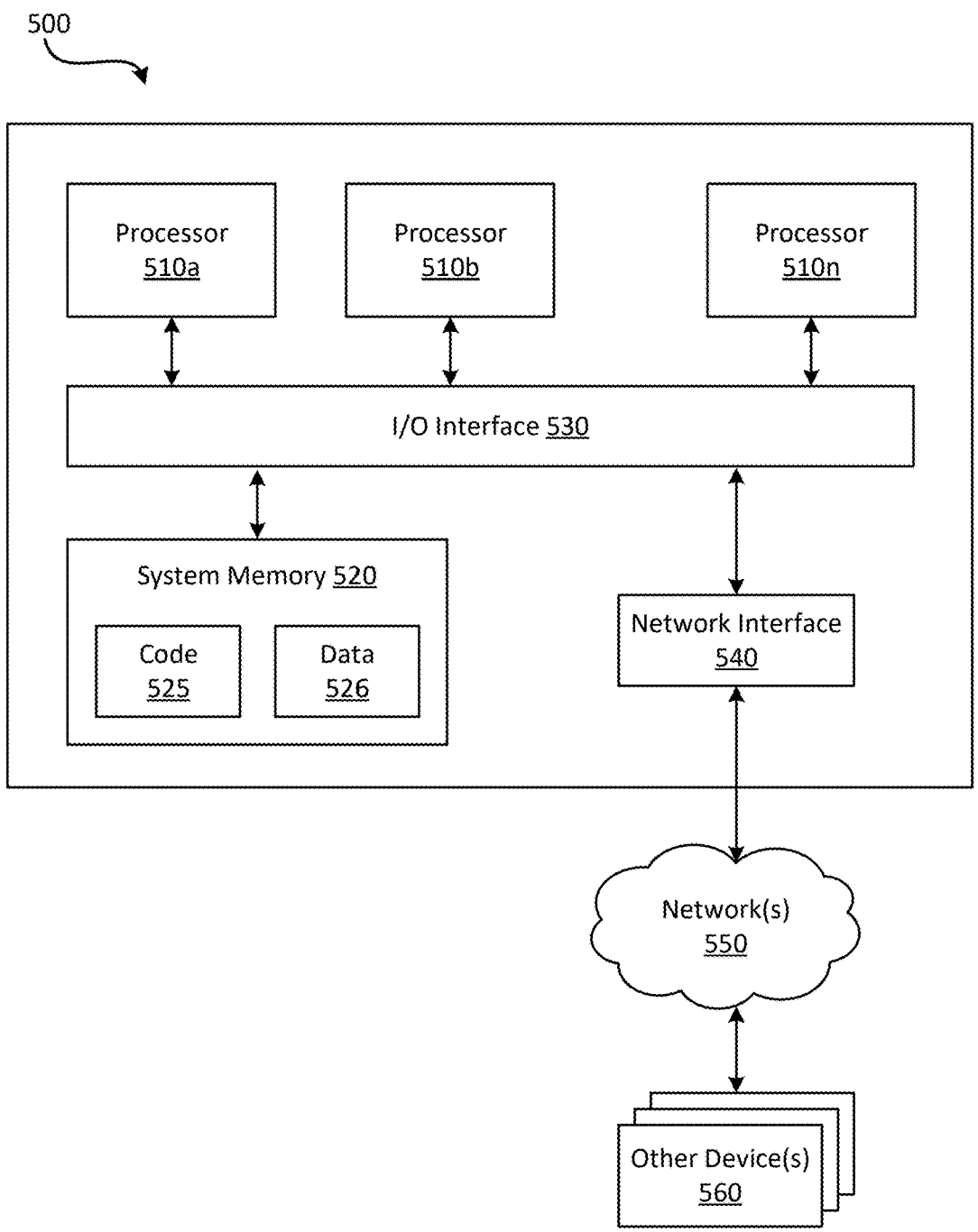
FIG. 5 is an example computing system in accordance with the present disclosure.

FIG. 5 illustrates a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x55, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between the processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 5, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 5, may include other components that are not explicitly shown in FIG. 5, or may utilize an architecture completely different than that shown in FIG. 5.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A system implementing a network function (NF) configuration and test generation framework, the system comprising:
  one or more processors; and
  a memory in communication with the one or more processors, the memory having computer-readable instructions stored thereupon that, when executed by the one or more processors, cause the system to execute the network function configurator and test generator framework, the network function configurator and test generator framework configured to generate a test script indicative of a configuration and test cases for verifying a virtual function implemented in a virtualized computing environment executing a plurality of virtual machines or containers implementing a mobile communications network, the network function configurator and test generator framework further configured to perform operations comprising:
  receiving a test input encoding information for verifying a network function configured to operate in the virtualized computing environment, the information including identification of a test tool that is implemented in the virtualized computing environment, a target testbed for testing the network function, and network information including parameters for network conditions to be operational during testing of the network function;
  using a data parser to translate and format the test input;
  inputting the formatted test input to a topology discoverer configured to identify a network topology of the testbed and which network functions deployed on the testbed are emulated and which network functions deployed on the testbed are real; wherein the translating and formatting comprises syntactic and semantic translation of the test input, and wherein the syntactic and semantic translation prompts the topology discoverer to identify the network topology and configurations of the network topology;
  based on outputs received from topology discoverer, generating, by a configuration generator, a configuration file usable to configure applicable network functions and their functionalities; and
  configuring the testbed based on the configuration file to verify the virtual function in the virtualized computing environment.

Clause 2: The system of clause 1, wherein the network information comprises one or more of data network name (DNN), Slice, public land mobile network (PLMN), tracking area code (TAC), or International Mobile Subscriber Identity IMSI/Subscription Permanent Identifier (SUPI) range.

Clause 3: The system of any of clauses 1-2, wherein the configuration generator is implemented by training a large language model with previously determined NF configurations.

Clause 4: The system of any of clauses 1-3, wherein the large language model is further trained with a 3GPP specification.

Clause 5: The system of any of clauses 1-4, wherein the mobile communications network is a 4G, 5G, or Any-G network.

Clause 6: The system of any of clauses 1-5, wherein the configuration file is a YAML file or XML file.

Clause 7: The system of any of clauses 1-6, wherein the test script includes a declarative statement indicating a goal state and a set of fields indicating configuration data.

Clause 8: A method for implementing a network function configuration and test generation framework configured to generate a test script indicative of a configuration and test cases for verifying a virtual function implemented in a virtualized computing environment executing a plurality of virtual machines or containers implementing a mobile communications network, the method comprising:
  receiving a test input encoding information for verifying a network function configured to operate in the virtualized computing environment, the information including identification of a test tool that is implemented in the virtualized computing environment, a target testbed for testing the network function, and network information including parameters for network conditions to be operational during testing of the network function;
  using a data parser to translate and format the test input;
  inputting the formatted test input to a topology discoverer configured to identify a network topology of the testbed and which network functions deployed on the testbed are emulated and which network functions deployed on the testbed are real; wherein the translating and formatting comprises syntactic and semantic translation of the test input, and wherein the syntactic and semantic translation prompts the topology discoverer to identify the network topology and configurations of the network topology;
  based on outputs received from topology discoverer, generating, by a configuration generator, a configuration file usable to configure applicable network functions and their functionalities; and
  configuring the testbed based on the configuration file to verify the virtual function in the virtualized computing environment.

Clause 9: The method of clause 8, wherein the network information comprises one or more of data network name (DNN), Slice, public land mobile network (PLMN), tracking area code (TAC), or International Mobile Subscriber Identity IMSI/Subscription Permanent Identifier (SUPI) range.

Clause 10: The method of any of clauses 8 and 9, wherein the configuration generator is implemented by training a large language model with previously determined NF configurations.

Clause 11: The method of any clauses 8-10, wherein the large language model is further trained with a 3GPP specification.

Clause 12: The method of any of clauses 8-11, wherein the mobile communications network is a 4G, 5G, or Any-G network.

Clause 13: The method of any clauses of 8-12, wherein the configuration file is a YAML file or XML file.

Clause 14: The method of any clauses of 8-13, wherein the test script includes a declarative statement indicating a goal state and a set of fields indicating configuration data.

Clause 15: A computer-readable storage medium having encoded thereon computer-readable instructions that when executed by a system, cause the system to perform operations comprising:
receiving a test input encoding information for verifying a network function configured to operate in a virtualized computing environment, the information including identification of a test tool that is implemented in the virtualized computing environment, a target testbed for testing the network function, and network information including parameters for network conditions to be operational during testing of the network function;
using a data parser to translate and format the test input;
inputting the formatted test input to a topology discoverer configured to identify a network topology of the testbed and which network functions deployed on the testbed are emulated and which network functions deployed on the testbed are real; wherein the translating and formatting comprises syntactic and semantic translation of the test input, and wherein the syntactic and semantic translation prompts the topology discoverer to identify the network topology and configurations of the network topology;
based on outputs received from topology discoverer, generating, by a configuration generator, a configuration file usable to configure applicable network functions and their functionalities; and
configuring the testbed based on the configuration file to verify a virtual function in the virtualized computing environment.

Clause 16: The computer-readable storage medium of clause 15, wherein the network information comprises one or more of data network name (DNN), Slice, public land mobile network (PLMN), tracking area code (TAC), or International Mobile Subscriber Identity IMSI/Subscription Permanent Identifier (SUPI) range.

Clause 17: The computer-readable storage medium of any of clauses 15 and 16, wherein the configuration generator is implemented by training a large language model with previously determined NF configurations.

Clause 18: The computer-readable storage medium of any of clauses 15-17, wherein the large language model is further trained with a 3GPP specification.

Clause 19: The computer-readable storage medium of any of clauses 15-18, wherein the virtualized computing environment executes a plurality of virtual machines or containers implementing a mobile communications network is a 4G, 5G, or Any-G network.

Clause 20: The computer-readable storage medium of any of clauses 15-19, wherein the network function configurator and test generator framework is configured to generate a test script indicative of a configuration and test cases for verifying the virtual function, wherein the test script includes a declarative statement indicating a goal state and a set of fields indicating configuration data.

The invention claimed is:

1. A system implementing a network function (NF) configurator and test generator framework, the system comprising:
one or more processors; and
a memory in communication with the one or more processors, the memory having computer-readable instructions stored thereupon that, when executed by the one or more processors, cause the system to execute the network function configurator and test generator framework, the network function configurator and test generator framework configured to generate a test script indicative of a configuration and test cases for verifying a virtual function implemented in a virtualized computing environment executing a plurality of virtual machines or containers implementing a mobile communications network, the network function configurator and test generator framework further configured to perform operations comprising:
receiving a test input encoding information for verifying a network function configured to operate in the virtualized computing environment, the information including identification of a test tool that is implemented in the virtualized computing environment, a target testbed for testing the network function, and network information including parameters for network conditions to be operational during testing of the network function;
using a data parser to translate and format the test input;
inputting the formatted test input to a topology discoverer configured to identify a network topology of the target testbed and which network functions deployed on the target testbed are emulated and which network functions deployed on the target testbed are real; wherein the translating and formatting comprises syntactic and semantic translation of the test input, and wherein the syntactic and semantic translation prompts the topology discoverer to identify the network topology and configurations of the network topology;
based on outputs received from the topology discoverer, generating, by a network function configurator, a configuration file, wherein the configuration file is used to configure applicable network functions and their functionalities; and
configuring the target testbed based on the configuration file and verifying the virtual function in the virtualized computing environment.

2. The system of claim 1, wherein the network information comprises one or more of data network name (DNN), Slice, public land mobile network (PLMN), tracking area code (TAC), or International Mobile Subscriber Identity IMSI/Subscription Permanent Identifier (SUPI) range.

3. The system of claim 1, wherein the network function configurator is implemented by training a large language model with previously determined network function (NF) configurations.

4. The system of claim 3, wherein the large language model is further trained with a 3rd Generation Partnership Project (3GPP) specification.

5. The system of claim 1, wherein the mobile communications network is a 4G, 5G, or Any-G network.

6. The system of claim 1, wherein the configuration file is a YAML file or Extensible Markup Language (XML) file.

7. The system of claim 1, wherein the test script includes a declarative statement indicating a goal state and a set of fields indicating configuration data.

8. A method for implementing a network function configurator and test generation framework configured to generate a test script indicative of a configuration and test cases for verifying a virtual function implemented in a virtualized computing environment executing a plurality of virtual machines or containers implementing a mobile communications network, the method comprising:
receiving a test input encoding information for verifying a network function configured to operate in the virtualized computing environment, the information including identification of a test tool that is implemented in the virtualized computing environment, a target testbed for testing the network function, and network information including parameters for network conditions to be operational during testing of the network function;

using a data parser to translate and format the test input;

inputting the formatted test input to a topology discoverer configured to identify a network topology of the target testbed and which network functions deployed on the target testbed are emulated and which network functions deployed on the target testbed are real; wherein the translating and formatting comprises syntactic and semantic translation of the test input, and wherein the syntactic and semantic translation prompts the topology discoverer to identify the network topology and configurations of the network topology;

based on outputs received from the topology discoverer, generating, by the network function configurator, a configuration file, wherein the configuration file is used to configure applicable network functions and their functionalities; and configuring the target testbed based on the configuration file and verifying the virtual function in the virtualized computing environment.

9. The method of claim 8, wherein the network information comprises one or more of data network name (DNN), Slice, public land mobile network (PLMN), tracking area code (TAC), or International Mobile Subscriber Identity IMSI/Subscription Permanent Identifier (SUPI) range.

10. The method of claim 8, wherein the network function configurator is implemented by training a large language model with previously determined network function (NF) configurations.

11. The method of claim 10, wherein the large language model is further trained with a 3rd Generation Partnership Project (3GPP) specification.

12. The method of claim 8, wherein the mobile communications network is a 4G, 5G, or Any-G network.

13. The method of claim 8, wherein the configuration file is a YAML file or Extensible Markup Language (XML) file.

14. The method of claim 8, wherein the test script includes a declarative statement indicating a goal state and a set of fields indicating configuration data.

15. A computer-readable storage medium having encoded thereon computer-readable instructions that when executed by a system implementing a network function configurator and test generator framework, cause the system to perform operations comprising:

receiving a test input encoding information for verifying a network function configured to operate in a virtualized computing environment executing a plurality of virtual machines or containers implementing a mobile communications network, the network function configurator and test generator framework configured to generate a test script indicative of a configuration and test cases for verifying a virtual function implemented in the virtualized computing environment, the information including identification of a test tool that is implemented in the virtualized computing environment, a target testbed for testing the network function, and network information including parameters for network conditions to be operational during testing of the network function;

using a data parser to translate and format the test input;

inputting the formatted test input to a topology discoverer configured to identify a network topology of the target testbed and which network functions deployed on the target testbed are emulated and which network functions deployed on the target testbed are real; wherein the translating and formatting comprises syntactic and semantic translation of the test input, and wherein the syntactic and semantic translation prompts the topology discoverer to identify the network topology and configurations of the network topology;

based on outputs received from the topology discoverer, generating, by a network function configurator, a configuration file, wherein the configuration file is used to configure applicable network functions and their functionalities; and configuring the target testbed based on the configuration file and verifying the virtual function in the virtualized computing environment.

16. The computer-readable storage medium of claim 15, wherein the network information comprises one or more of data network name (DNN), Slice, public land mobile network (PLMN), tracking area code (TAC), or International Mobile Subscriber Identity IMSI/Subscription Permanent Identifier (SUPI) range.

17. The computer-readable storage medium of claim 15, wherein the network function configurator is implemented by training a large language model with previously determined network function (NF) configurations.

18. The computer-readable storage medium of claim 17, wherein the large language model is further trained with a 3rd Generation Partnership Project (3GPP) specification.

19. The computer-readable storage medium of claim 15, wherein the mobile communications network is a 4G, 5G, or Any-G network.

20. The computer-readable storage medium of claim 15, wherein the network function configurator and test generator framework are configured to generate a test script indicative of a configuration and test cases for verifying the virtual function, wherein the test script includes a declarative statement indicating a goal state and a set of fields indicating configuration data.

* * * * *